United States Patent
Wang et al.

(10) Patent No.: US 11,569,498 B2
(45) Date of Patent: Jan. 31, 2023

(54) NEGATIVE ELECTRODE ACTIVE MATERIAL AND METHOD FOR PREPARATION THEREOF, SECONDARY BATTERY, AND APPARATUS INCLUDING SECONDARY BATTERY

(71) Applicant: Contemporary Amperex Technology Co., Limited, Ningde (CN)

(72) Inventors: Jiazheng Wang, Ningde (CN); Xiaobin Dong, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/547,264

(22) Filed: Dec. 10, 2021

(65) Prior Publication Data
US 2022/0166009 A1 May 26, 2022

Related U.S. Application Data

(63) Continuation of application No. PCT/CN2020/088426, filed on Apr. 30, 2020.

(51) Int. Cl.
*H01M 4/36* (2006.01)
*C01B 32/205* (2017.01)
(Continued)

(52) U.S. Cl.
CPC ............ *H01M 4/366* (2013.01); *C01B 32/05* (2017.08); *C01B 32/205* (2017.08); *H01M 4/133* (2013.01); *C01P 2004/03* (2013.01); *C01P 2004/51* (2013.01); *C01P 2004/61* (2013.01); *C01P 2006/11* (2013.01);
(Continued)

(58) Field of Classification Search
None
See application file for complete search history.

(56) References Cited

U.S. PATENT DOCUMENTS

2018/0331354 A1   11/2018   Kim et al.

FOREIGN PATENT DOCUMENTS

| CN | 109167011 A | 1/2019 |
|----|-------------|--------|
| CN | 109585803 A | 4/2019 |

(Continued)

OTHER PUBLICATIONS

The International search report for PCT Application No. PCT/CN2020/088426, dated Jan. 27, 2021, 18 pages.
(Continued)

*Primary Examiner* — Daniel S Gatewood
(74) *Attorney, Agent, or Firm* — East IP P.C.

(57) ABSTRACT

The present application discloses a negative electrode active material and a method for preparation thereof, a secondary battery, and an apparatus including the secondary battery. The negative electrode active material includes a core and a coating layer covering a surface of the core, the core includes artificial graphite, the coating layer includes amorphous carbon, the negative electrode active material has a surface area average particle size D(3,2) denoted as A, the negative electrode active material has a surface area average particle size D(3,2) denoted as B after powder compaction under a pressure of 20 kN, and the negative electrode active material satisfies: 72%≤B/A×100%≤82%.

12 Claims, 2 Drawing Sheets

(51) Int. Cl.
    *C01B 32/05*    (2017.01)
    *H01M 4/133*    (2010.01)
    *H01M 4/02*     (2006.01)

(52) U.S. Cl.
    CPC ...... *C01P 2006/12* (2013.01); *C01P 2006/40* (2013.01); *H01M 2004/021* (2013.01); *H01M 2004/027* (2013.01); *H01M 2220/20* (2013.01)

(56) References Cited

FOREIGN PATENT DOCUMENTS

| | | | | |
|---|---|---|---|---|
| CN | 110828824 A | | 2/2020 | |
| CN | 111048749 A | * | 4/2020 | ........ H01M 10/0525 |
| CN | 111048749 A | | 4/2020 | |
| EP | 3358653 A1 | | 8/2018 | |
| JP | 2016046204 A | | 4/2016 | |
| JP | 2017-525083 A | | 8/2017 | |
| JP | 2019-179687 A | | 10/2019 | |
| WO | 2012/127548 A1 | | 9/2012 | |
| WO | 2014092141 A1 | | 6/2014 | |

OTHER PUBLICATIONS

The extended European search report dated Jun. 23, 2022 for European Application No. 20933645.2 7 pages.
Malvern Instruments Worldwide: "A basic guide to particle characterization", issue 2015, 24 pages.
The Office Action for Japanese Application No. 2022-534656, dated Dec. 12, 2022, 4 pages.

\* cited by examiner

NEGATIVE ELECTRODE ACTIVE MATERIAL AND METHOD FOR PREPARATION THEREOF, SECONDARY BATTERY, AND APPARATUS INCLUDING SECONDARY BATTERY

CROSS-REFERENCE TO RELATED APPLICATION

This application is a continuation of International Application No. PCT/CN2020/088426, filed on Apr. 30, 2020, which is incorporated herein by reference in its entireties.

TECHNICAL FIELD

This application belongs to the technical field of secondary batteries, and specifically relates to a negative electrode active material and a method for preparation thereof, a secondary battery, and an apparatus including the secondary battery.

BACKGROUND

Secondary batteries have been widely used because of their characteristics such as reliable performance, no pollution, and no memory effect. For example, with the increasing attention to environmental protection issues and the increasing popularity of new energy vehicles, the demand for power-type secondary batteries is showing an explosive growth. However, as the application range of secondary batteries becomes wider and wider, severe challenges are also posed to the performance of secondary batteries. Energy density affects endurance of secondary batteries (that is, usage time after one charge). Therefore, the development of secondary battery technology needs to be based on high energy density. However, the inventors found that, when the energy density of a battery is relatively high, its fast charging performance and cycle life are usually relatively poor.

Therefore, how to enable a secondary battery to have high energy density, fast charging capability and cycle performance at the same time is an important aspect in the research and development of the secondary battery.

SUMMARY

The inventors have conducted a lot of research to improve a negative electrode active material, so that its structural stability and fast active ion transport capability are improved under the premise of relatively high gram capacity, and a secondary battery with relatively high energy density, fast charging capability and cycle life can be obtained accordingly.

Therefore, the first aspect of the present application provides a negative electrode active material, including a core and a coating layer covering a surface of the core, wherein the core includes artificial graphite, the coating layer includes amorphous carbon, the negative electrode active material has a surface area average particle size $D(3,2)$ denoted as A, the negative electrode active material has a surface area average particle size $D(3,2)$ denoted as B after powder compaction under a pressure of 20 kN, and the negative electrode active material satisfies: $72\% \leq B/A \times 100\% \leq 82\%$.

The second aspect of the present application provides a secondary battery, including a negative electrode plate, the negative electrode plate including the negative electrode active material according to the first aspect of the present application.

The third aspect of the present application provides an apparatus, including the secondary battery according to the second aspect of the present application.

The fourth aspect of the present application provides a method for preparation of a negative electrode active material, including the following steps:

a) providing a coke raw material, wherein the coke raw material has a volume average particle size $D_v 50$ of from 7 μm to 12 μm, and the coke raw material has a volatile content $C_1$ satisfying $1\% \leq C_1 \leq 12\%$;

b) shaping and grading the coke raw material to obtain a precursor with a particle size distribution $(D_v 90 - D_v 10)/D_v 50$ of from 1.0 to 1.55;

c) granulating the precursor to obtain a granulated product, wherein a binder added during the granulating has an amount $C_2$ satisfying $0\% \leq C_2 \leq 16\%$, and the $C_1$ and the $C_2$ satisfy $10\% \leq C_1 + C_2 \leq 16\%$, and preferably, $12\% \leq C_1 + C_2 \leq 14\%$;

d) graphitizing the granulated product to obtain artificial graphite;

e) coating the artificial graphite with an organic carbon source, performing heat treatment to form an amorphous carbon coating layer on at least a part of the surface of the artificial graphite, to obtain the negative electrode active material, wherein the organic carbon source added during the coating has an amount $C_3$, and the $C_3$, the $C_1$ and the $C_2$ satisfy $13\% \leq C_1 + C_2 + C_3 \leq 18\%$, and $1.5\% \leq C_3 \times$ carbon residue rate $\leq 3.5\%$;

wherein the negative electrode active material has a surface area average particle size $D(3,2)$ denoted as A, the negative electrode active material has a surface area average particle size $D(3,2)$ denoted as B after powder compaction under a pressure of 20 kN, and the negative electrode active material satisfies: $72\% \leq B/A \times 100\% \leq 82\%$.

Compared with the prior art, the present application has at least the following beneficial effects:

It is surprisingly found that the negative electrode active material provided by the present application includes a core and a coating layer covering a surface of the core, the core includes artificial graphite, the coating layer includes amorphous carbon, and $D(3,2)$ values of the negative electrode active material before and after powder compaction under a pressure of 20 kN satisfy a specific relationship, which enables the negative electrode active material to have relatively high gram capacity, and can greatly improve fast active ion transport capability of the negative electrode active material and its structural stability under pressure (such as cyclic expansion force of a negative electrode). Therefore, the negative electrode active material of the present application enables the secondary battery to have a relatively high energy density and can improve its fast charging capability and cycle life. The apparatus of the present application includes the secondary battery provided by the present application, and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the drawings without creative work.

DETAILED DESCRIPTION

Figure 1:
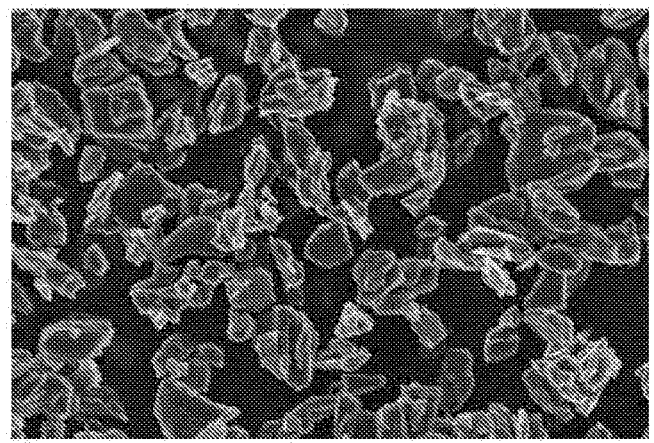
FIG. 1 is a scanning electron microscope (SEM) image of an embodiment of artificial graphite.

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Negative Electrode Active Material

An embodiment of the first aspect of the present application provides a negative electrode active material. The negative electrode active material comprises a core and a coating layer covering a surface of the core, the core comprises artificial graphite, the coating layer comprises amorphous carbon, the negative electrode active material has a surface area average particle size D(3,2) denoted as A, the negative electrode active material has a surface area average particle size D(3,2) denoted as B after powder compaction under a pressure of 20 kN, and the negative electrode active material satisfies: 72%≤B/A×100%≤82%.

The negative electrode active material provided by the present application comprises a core and a coating layer covering a surface of the core, the core comprises artificial graphite, the coating layer comprises amorphous carbon, and D(3,2) values of the negative electrode active material before and after powder compaction under a pressure of 20 kN satisfy a specific relationship, which enables the negative electrode active material to have relatively high gram capacity, and can greatly improve fast active ion transport capability of the negative electrode active material and its structural stability under force. The term "force" includes huge internal stress (referred to as cyclic expansion force) generated by the negative electrode active material subjected to repeated contraction and expansion of the negative electrode during cyclic charge and discharge of the battery. Therefore, the negative electrode active material of the present application enables the secondary battery to have a relatively high energy density and can improve its fast charging capability and cycle life, so that the secondary battery can simultaneously have relatively high energy density, fast charging performance and cycle performance.

The inventors found through research that artificial graphite has a layered structure formed by graphite layers arranged along a c-axis direction, and its surface includes a basal plane and an edge plane. Active ions are mainly intercalated in and deintercalated from the edge plane of the artificial graphite. Therefore, the higher the ratio of the edge plane to the basal plane is, the more beneficial the fast transport of active ions is. The inventors surprisingly found that, when the negative electrode active material satisfies an appropriate relationship between D(3,2) values before and after powder compaction under a pressure of 20 kN, it can have relatively high structural stability and relatively high ratio of the edge plane to the basal plane. Therefore, the negative electrode active material has relatively high gram capacity, relatively long cycle life and relatively high fast active ion transport performance, so that the secondary battery using it has relatively high energy density, relatively long cycle life and relatively good fast charging capability.

In some embodiments, the negative electrode active material may satisfy: 72%≤B/A×100%≤80%, 74%≤B/A×100%≤82%, 74.5%≤B/A×100%≤79%, 75.5%≤B/A×100%≤81%, 76%≤B/A×100%≤82%, or 77%≤B/A×100%≤80%.

In some preferred embodiments, the negative electrode active material satisfies 74%≤B/A×100%≤80%. The B/A value of the negative electrode active material within an appropriate range is more conducive to enabling the battery to have relatively high fast charging capability and cycle life.

In some preferred embodiments, 80% to 100% of the surface of the core may be covered with the amorphous carbon coating layer. More preferably, 90% to 100% of the surface of the core may be covered with the amorphous carbon coating layer.

The amorphous carbon coating layer may be formed by carbonization of an organic carbon source. For example, the organic carbon source may be selected from high molecular polymers, such as coal pitch, petroleum pitch, and phenolic resin.

The amorphous carbon has a disordered structure and a relatively high interlayer spacing. Therefore, the use of amorphous carbon to coat the core material enables active ions to diffuse relatively fast in negative electrode active material particles, thereby improving the fast charging capability of the material. Meanwhile, the amorphous carbon coating layer can also protect the core material and greatly reduce peeling of the graphite layer due to co-intercalating of a solvent in the core material, so that the negative electrode active material has relatively high structural stability. Therefore, the negative electrode active material can have relatively high capacity and cycle life.

The inventors found through in-depth research that, when the negative electrode active material of the present application satisfies the above conditions, if it further optionally satisfy one or more of the following design conditions, it can further improve the performance of the secondary battery.

In some preferred embodiments, D(3,2) (i.e. A) of the negative electrode active material may satisfy: 9 µm≤A≤15 µm. For example, 9 µm≤A≤14.5 µm, 9.5 µm≤A≤14 µm, 10 µm≤A≤14 µm, 10.5 µm≤A≤14 µm, 11 µm≤A≤14 µm, 12 µm≤A≤14 µm, 9.5 µm≤A≤13 µam, 10 µm≤A≤13 µm, 10.5 µm≤A≤13 µm, or 11 µm≤A≤13 µm. More preferably, 11 µm≤A≤13 µm.

The D(3,2) of the negative electrode active material is within an appropriate range, so that active ions and electrons have relatively short diffusion paths in particles, thereby improving the active ion diffusion rate and electronic conductivity of the negative electrode active material, and improving the fast charging capability of the battery. The negative electrode active material with appropriate D(3,2) has relatively high gram capacity, and also enables an electrode plate using it to obtain relatively high compaction density, so it can also increase the energy density of the battery. In addition, the negative electrode active material has a relatively small active specific surface area, which can reduce side reactions of the electrolyte on its surface, thereby enabling the battery to have relatively high cycle performance.

In some preferred embodiments, the negative electrode active material may have a volume average particle size $D_v50$ satisfying: 10 µm≤$D_v50$≤16 µm. For example, the $D_v50$ of the negative electrode active material may be ≥10.5 µm, ≥11 µm, ≥11.5 µm, ≥12 µm, or ≥12.5 µm; further, the $D_v50$ of the negative electrode active material may be ≤15.5 µm, ≤15 µm, ≤14.5 µm, ≤14 µm, ≤13.5 µm, or ≤13 µm. More preferably, 12 µm≤$D_v50$≤14 µm.

The $D_v50$ of the negative electrode active material is suitable for making the negative electrode active material have relatively high performance on fast active ion and electron transport, and can also reduce side reaction of the electrolyte at the negative electrode. The negative electrode active material with the suitable $D_v50$ is also beneficial for increasing its own powder compaction density, so that the electrode plate using it can obtain a relatively high compaction density, and the energy density of the battery can thus be increased.

In some preferred embodiments, the negative electrode active material may simultaneously satisfy 9 µm≤A≤14 µm and 10 µm≤$D_v50$≤15 µm. More preferably, the negative electrode active material may simultaneously satisfy 11 µm≤A≤13 µm and 12 µm≤$D_v50$≤14 µm.

The negative electrode active material simultaneously satisfies A and $D_v50$ within the appropriate ranges, so that the negative electrode active material has a relatively good surface structure and particle size distribution. Therefore, the negative electrode active material can also have relatively high electrochemical kinetic performance and relatively high surface stability, which can further improve the fast charging capability and cycle performance of the battery. In addition, in the electrode plate made of the negative electrode active material, particles can form close contact therebetween while forming good pore structures, so that the electrode plate has relatively high active ion solid-phase diffusion performance and liquid-phase conductivity, which further improves the fast charging capability of the battery.

In some preferred embodiments, the negative electrode active material has a particle size distribution $(D_v90-D_v10)/D_v50$ satisfying: 1.0≤$(D_v90-D_v10)/D_v50$≤1.35. For example, the $(D_v90-D_v10)/D_v50$ of the negative electrode active material may be 1.1, 1.15, 1.18, 1.2, 1.25, or 1.3. More preferably, 1.15≤$(D_v90-D_v10)/D_v50$≤1.25.

The proper particle size distribution makes the negative electrode active material contain an appropriate amount of relatively large particles and relatively small particles. A negative electrode film prepared from such negative electrode active material can obtain a relatively high compaction density, and the material particles therein can have a relatively large contact area, which enables the negative electrode plate to have relatively high reversible capacity and improves the active ion solid-phase diffusion performance and electronic conductivity in the negative electrode film. The particle size distribution of the negative electrode active material also enables the negative electrode film to form a clear and open pore structure, especially with relatively short liquid-phase conduction path of active ions and relatively low impedance. Therefore, the battery can obtain relatively high fast charging capability and energy density.

Moreover, as the particle size distribution of the negative electrode active material is within an appropriate range, the negative electrode film also has relatively high cohesion force, which can reduce cyclic expansion force of the battery. In addition, the negative electrode active material has a relatively small number of small particles, which can reduce side reactions in the battery. Therefore, the cycle life of the battery can be further improved.

In some preferred embodiments, the negative electrode active material may simultaneously satisfy 10 µm≤$D_v50$≤16 µm and 1.0≤$(D_v90-D_v10)/D_v50$≤1.35. More preferably, the negative electrode active material may simultaneously satisfy 12 µm≤$D_v50$≤14 µm and 1.1≤$(D_v90-D_v10)/D_v50$≤1.3.

In these embodiments, further, 9 µm≤A≤14 µm. Preferably, 11 µm≤A≤13 µm.

In some preferred embodiments, the negative electrode active material has a volume particle size distribution $D_v90$ satisfying: 18 µm≤$D_v90$≤26 µm. More preferably, 20 µm≤$D_v90$≤24 µm. The $D_v90$ of the negative electrode active material within an appropriate range can further reduce the content of large particles in the negative electrode active material and improve the fast transport performance of active ions and electrons, thereby further improving the fast charging capability of the battery. In addition, the negative electrode active material has a relatively small number of large particles, which is beneficial for uniformly distributing the negative electrode active material in the film and can further improve the active ion and electron transport performance of the film, and reduce polarization of the battery, so that the battery obtains relatively high fast charging capability and cycle performance.

In some preferred embodiments, the negative electrode active material may have a tap density of from 0.9 g/cm³ to 1.15 g/cm³, and more preferably from 0.95 g/cm³ to 1.05 g/cm³. The tap density of the negative electrode active material within an appropriate range enables the negative electrode active material to have relatively high capability of fast transporting active ions and electrons. Meanwhile, the negative electrode active material has a relatively small degree of secondary particles, and can thus have relatively high gram capacity and relatively low side reaction. Therefore, the appropriate tap density can improve the fast charging capability, energy density and cycle life of the battery.

In some preferred embodiments, the negative electrode active material may simultaneously satisfy 10 µm≤$D_v50$≤15

μm and the tap density of from 0.9 g/cm³ to 1.15 g/cm³. Preferably, the negative electrode active material may simultaneously satisfy 12 μm≤$D_v50$≤14 μm and the tap density of from 0.95 g/cm³ to 1.05 g/cm³.

The negative electrode active material simultaneously satisfies $D_v50$ and the tap density within appropriate ranges, and can thus have relatively high bulk structure stability and surface stability, relatively high ratio of edge plane to basal plane and relatively short active ion and electron transport path. Therefore, the negative electrode active material enables the battery to have relatively high cycle performance, and further improves the fast charging capability of the battery.

Further, 1.0≤($D_v90-D_v10$)/$D_v50$≤1.35. Preferably, 1.15≤($D_v90-D_v10$)/$D_v50$≤1.25.

Further, 9 μm≤A≤14 μm. Preferably, 11 μm≤A≤13 μm.

In some preferred embodiments, the negative electrode active material may have a graphitization degree of from 90% to 96%, and more preferably from 92% to 95%. The higher the graphitization degree of the negative electrode active material is, the lower the powder resistivity is. The negative electrode active material having the graphitization degree within an appropriate range can have a relatively small powder resistivity and a relatively large interlayer spacing, which reduces resistance to solid-phase diffusion of active ions in particles, thereby increasing its fast charging capability. In addition, the appropriate graphitization degree also enables the artificial graphite to not easily undergo solvent co-intercalation during the cycle process of the battery, and the graphite layer is not easily peeled off accordingly, which improves the structural stability of the negative electrode active material.

In some preferred embodiments, the negative electrode active material may have a powder OI value of from 2.0 to 5.0, more preferably from 2.1 to 4.0, and particularly preferably from 2.5 to 3.5.

The negative electrode active material having the powder OI value within the appropriate range can have relatively high isotropy. As such, active ions can be intercalated/de-intercalated in different directions, so ion migration paths are shortened, and ion diffusion resistance is reduced, thereby improving the fast charging capability of the battery. Meanwhile, the expansion of the negative electrode active material during ion intercalation can be dispersed in all directions, thereby reducing cyclic expansion of the electrode plate and the battery and prolonging cycle life.

In some preferred embodiments, the negative electrode active material has a gram capacity C satisfying: 350 mAh/g≤C≤356 mAh/g, and more preferably 352 mAh/g≤C≤354 mAh/g. While the negative electrode active material has a relatively high gram capacity, it can shorten migration paths of active ions therein and increase the solid-phase diffusion rate of active ions, so that the battery has relatively high energy density and fast charging capability. In addition, the negative electrode active material may further have relatively high structural stability, so it is not easy to disintegrate in the process of stress, and particles in the electrode plate can have relatively high cohesion, so that the battery has relatively long cycle life.

In the present application, the surface area average particle size D(3,2) of the negative electrode active material has a well-known meaning in the art, and can be tested by a known method in the art. For example, it may be measured with a laser diffraction particle size distribution measuring instrument (such as Mastersizer 3000) with reference to the standard GB/T19077.1-2016. In the present application, a specific test may be done as follows:

(1) Taking an appropriate amount of the negative electrode active material of the present application and dividing into 2 samples to be tested (denoted as sample 1 and sample 2);
(2) Measuring a surface area average particle size D(3,2) of the sample 1 by using the test standard and instrument described above, denoted as A;
(3) Performing powder compaction on the sample 2 under a pressure of 20 kN, and followed by measuring a surface area average particle size D(3,2) of the sample 2 by using the standard and instrument described above, denoted as B;
(4) Obtaining a value of B/A×100% by calculation.

In the present application, $D_v10$, $D_v50$, and $D_v90$ of the negative electrode active material have well-known meanings in the art, and can be tested by known methods in the art. For example, they may be measured with a laser particle size analyzer (such as Malvern Mastersizer 3000) with reference to the standard GB/T19077.1-2016.

Physical definitions of $D_v10$, $D_v50$, and $D_v90$ are as follows:

$D_v10$: the corresponding particle size when the cumulative volume distribution percentage of the negative electrode active material reaches 10%;

$D_v50$: the corresponding particle size when the cumulative volume distribution percentage of the negative electrode active material reaches 50%;

$D_v90$: the corresponding particle size when the cumulative volume distribution percentage of the negative electrode active material reaches 90%.

The tap density of the negative electrode active material has a well-known meaning in the art, and can be tested by a known method in the art. For example, the tap density can be measured with a powder tap density tester with reference to the standard GB/T5162-2006. For example, the tap density is measured by using FZS4-4B tap density meter of Beijing Iron and Steel Research Institute, with the test parameters as follows: vibration frequency: 250±15 times/min, amplitude: 3±0.2 mm, number of vibrations: 5000 times, measuring cylinder: 25 mL.

The graphitization degree of the negative electrode active material has a well-known meaning in the art, and can be tested by a known method in the art. For example, the graphitization degree can be tested with an X-ray diffractometer (such as Bruker D8 Discover). The test can refer to JIS K 0131-1996, JB/T 4220-2011, in which $d_{002}$ that is the interlayer spacing in the graphite crystal structure in nanometers (nm) is measured, and then the graphitization degree is calculated according to a formula G=(0.344−$d_{002}$)/(0.344−0.3354)×100%. In the X-ray diffraction analysis test, a copper target can be used as an anode target, $CuK_\alpha$ rays are used as a radiation source, ray wavelength λ=1.5418 Å, the scanning 2θ angle range is from 20° to 80°, and the scanning rate is 4°/min.

The powder OI value of the negative electrode active material has a well-known meaning in the art, and can be tested by a known method in the art. The powder OI value of the negative electrode active material is defined to be equal to $I_{004}/I_{110}$. In the X-ray diffraction analysis of the negative electrode active material, the peak area of a diffraction peak of a 004 crystal plane of graphite is $I_{004}$, and the peak area of a diffraction peak of a 110 crystal plane of graphite is $I_{110}$. The X-ray diffraction analysis can refer to the standard JISK0131-1996, and use an X-ray diffractometer (such as Bruker D8 Discover X-ray diffractometer) for testing. In the X-ray diffraction analysis test, a copper target can be used as an anode target, $CuK_\alpha$ rays are used as a radiation source, ray wavelength λ=1.5418 Å, the scanning 2θ angle range is from 20° to 80°, and the scanning rate is 4°/min.

The 2θ angle corresponding to the 004 crystal plane of artificial graphite is from 53.5° to 55.5° (for example, 54.5°); the 2θ angle corresponding to the 110 crystal plane of artificial graphite is from 76.5° to 78.5° (for example, 77.4°).

Next, a method for preparation of negative electrode active materials according to an embodiment of the present application is described. Any of the above-mentioned negative electrode active materials can be prepared by the method for preparation.

S10, providing a coke raw material, wherein the coke raw material has a volume average particle size $D_v50$ of from 7 µm to 12 µm, and the coke raw material has a volatile content $C_1$ satisfying $1\% \leq C_1 \leq 12\%$.

S20, shaping and grading the coke raw material to obtain a precursor with a particle size distribution $(D_v90-D_v10)/D_v50$ of from 1.0 to 1.55.

S30, granulating the precursor to obtain a granulated product, wherein a binder added during the granulating has an amount $C_2$ satisfying $0\% \leq C_2 \leq 16\%$, and the $C_1$ and the $C_2$ satisfy $10\% \leq C_1+C_2 \leq 16\%$, and preferably, $12\% \leq C_1+C_2 \leq 14\%$.

S40, graphitizing the granulated product to obtain artificial graphite.

S50, coating the artificial graphite with an organic carbon source, perform heat treatment to form an amorphous carbon coating layer on at least a part of the surface of the artificial graphite, to obtain the negative electrode active material, wherein the organic carbon source added during the coating has an amount $C_3$, and the $C_3$, the $C_1$ and the $C_2$ satisfy $13\% \leq C_1+C_2+C_3 \leq 18\%$, and $1.5\% \leq C_3 \times$ carbon residue rate $\leq 3.5\%$.

In the above method for preparation, in step S10, the coke raw material may be directly purchased commercially or obtained by crushing a coke material. In some embodiments, the coke material is crushed to obtain the coke raw material. The morphology of the coke raw material obtained after crushing preferably includes one or more of block, spherical, and spherical-like shapes. As such, the coke raw material can obtain a relatively high ratio of edge plane to basal plane, so that the negative electrode active material can have a relatively high ratio of edge plane to basal plane.

The coke raw material obtained by crushing has $D_v50$ of from 7 µm to 12 µm, and preferably, from 7 µm to 10 µm. The $D_v50$ of the coke raw material within an appropriate range can improve the subsequent granulating process, so that the obtained negative electrode active material has an appropriate degree of secondary particles and $D_v50$. In particular, the $D_v50$ of the coke raw material enables it to have a relatively high ratio of edge plane to basal plane.

Further, the coke raw material has a particle size distribution $(D_v90-D_v10)/D_v50$ of preferably from 1.2 to 1.7, and more preferably from 1.2 to 1.6. The coke raw material also has an appropriate particle size distribution, which can further optimize the ratio of its edge plane to basal plane. In addition, the particle size distribution of the coke raw material within the appropriate range is also conducive to making the particle size distribution of the subsequent shaping and grading product within an appropriate range, so that the obtained negative electrode active material has an appropriate degree of secondary particles, and also enables the $(D_v90-D_v10)/D_v50$ of the negative electrode active material within the aforementioned range.

In step S10, the coke raw material has a volatile content $C_1$ satisfying $1\% \leq C_1 \leq 12\%$. For example, the volatile content $C_1$ of the coke raw material may be $\geq 1\%$, $\geq 3\%$, $\geq 5\%$, $\geq 6\%$, $\geq 7\%$, or $\geq 8\%$; further, it may be $\leq 12\%$, $\leq 11\%$, $\leq 10\%$, or $\leq 9\%$. The appropriate volatile content of the coke raw material enables the prepared artificial graphite to have relatively high structural strength, so that the B/A of the negative electrode active material is within the aforementioned range. Preferably, $5\% \leq C_1 \leq 9\%$.

The volatile content of the coke raw material can be tested by a method known in the art. For example, it can be measured with reference to SH/T 0026-1990.

In some embodiments, the weight percentage of sulfur in the coke raw material may be $\leq 4\%$, for example, $\leq 1\%$ or $\leq 0.5\%$.

In some embodiments, the coke raw material includes one or more of petroleum-based non-needle coke, petroleum-based needle coke, coal-based non-needle coke, and coal-based needle coke.

Preferably, the coke raw material is selected from one or more of petroleum-based non-needle coke (such as petroleum calcined coke and petroleum-based green coke) and petroleum-based needle coke. More preferably, the coke raw material includes petroleum-based green coke. The appropriate coke raw material enables the prepared negative electrode active material to have relatively high structural stability and ratio of edge plane to basal plane, which is beneficial for keeping the B/A within the aforementioned range.

The coke raw material can be crushed using equipment and methods known in the art, such as an air-current mill, a mechanical mill or a roller mill. A lot of too small particles are often produced during the crushing, and sometimes too large particles are also produced, so grading can be performed as needed after the crushing to remove the too small and large particles from the powder after the crushing. The coke raw material with a relatively good particle size distribution can be obtained after the grading, which facilitates the subsequent shaping and granulating. The grading can be carried out by using equipment and methods known in the art, such as a grading screen, a gravity grader, or a centrifugal grader.

In step S20, edges and corners of the coke raw material particles are polished by the shaping. The greater the degree of shaping is, the closer the particles are to the spherical shape, which can increase the ratio of edge plane to basal plane. The shaping is also beneficial for the subsequent granulating, so that the secondary particles in the obtained negative electrode active material have relatively high structural stability.

In step S20, the coke raw material can be shaped by equipment and methods known in the art, such as a shaping machine or other shaping equipment.

After the coke raw material is shaped, the coke raw material is further graded to obtain a particle size distribution $(D_v90-D_v10)/D_v50$ of from 1.0 to 1.55, and preferably from 1.1 to 1.3, such as 1.15, 1.20, 1.23, 1.25, or 1.28. The grading controls the particle size distribution of the precursor within an appropriate range, so that the secondary particle degree and particle size distribution of the obtained negative electrode active material are within desired ranges.

In step S20, the grading can be carried out by using equipment and methods known in the art, such as a grading screen, a gravity grader, or a centrifugal grader.

In step S30, the precursor treated in step S20 is granulated, so that the independently dispersed primary particles are aggregated to form secondary particles. As such, the ratio of edge plane to basal plane of the artificial graphite and its isotropy can be improved. By adjusting the degree of secondary particles, that is, the ratio of the particle size of the primary particles in the secondary particles to the particle size of the secondary particles, the artificial graphite can also have relatively high structural stability. A binder added during the granulating has an amount $C_2$ satisfying $0\% \leq C_2 \leq 16\%$, and further, $2\% \leq C_2 \leq 10\%$. In addition, the amount $C_2$ of the binder added during the granulating in step S30 and the volatile content $C_1$ of the coke raw material satisfy $10\% \leq C_1 + C_2 \leq 16\%$. Preferably, $12\% \leq C_1 + C_2 \leq 14\%$. The aforementioned amount $C_2$ of the binder is a percentage of the weight of the binder added the granulating in the total weight of the coke raw material.

When the amount $C_2$ of the binder added during the granulating in step S30 and the volatile content $C_1$ of the coke raw material are controlled within the provided ranges, the granulation degree of the negative electrode active material particles can be improved, which is beneficial for keeping the values of A and B within the aforementioned ranges. In addition, this can further increase the gram capacity of the negative electrode active material, and is beneficial for improving the overall structural strength of the negative electrode active material particles.

In some embodiments, in step S30, the binder is preferably selected from pitch.

In step S30, the granulating can be carried out by using equipment known in the art, such as a granulator. The granulator usually includes a stirred reactor and a module for temperature control of the reactor. By adjusting the stirring speed, heating rate, granulating temperature, cooling rate, etc. during the granulating, the granulation degree and structural strength of the granules can be adjusted, which is beneficial for enabling the obtained negative electrode active material to have relatively high gram capacity relatively high structural stability and relatively high ratio of edge plane to basal plane.

Further, by adjusting the above process conditions, the volume average particle size $D_v50$ of the granulated product can be within the required range, and more preferably, the $D_v10$, $D_v50$, and $D_v90$ of the granulated product can all be within the required ranges.

By adjusting the particle size in step S10 and/or step S30, the $D_v50$, $D_v90$ and/or $(D_v90-D_v10)/D_v50$ of the finally obtained negative electrode active material can be within the required ranges.

In step S40, the granulated product obtained in step S30 is graphitized at a temperature of from 2800° C. to 3200° C. to obtain artificial graphite with an appropriate graphitization degree. In some embodiments, the temperature for graphitizing in step S40 is preferably from 2900° C. to 3100° C. When the graphitization degree is controlled within the provided range, the artificial graphite has a relatively high gram capacity, and the lattice expansion during lithium intercalation is relatively low.

In step S40, the graphitizing can be carried out by using equipment known in the art, such as a graphitization furnace, and further, an Acheson graphitization furnace. After the graphitizing, a small amount of too large particles formed by agglomeration of the granulated product during the high-temperature graphitization process can be removed by sieving. This can prevent the too large particles from affecting material processing properties, such as slurry stability and coating property.

In some embodiments, in step S50: mixing the artificial graphite obtained in step S40 with an organic carbon source, so that the organic carbon source is coated on at least a part of the surface of the artificial graphite; and then performing heating treatment at a temperature of from 700° C. to 1800° C. to carbonize the organic carbon source and form an amorphous carbon coating layer on at least the part of the surface of the artificial graphite, to obtain the negative electrode active material. Preferably, the temperature of the heating treatment is from 1000° C. to 1300° C.

The organic carbon source added during the coating process has an amount C3, and the $C_3$, $C_1$ and $C_2$ satisfy $13\% \leq C_1 + C_2 + C_3 \leq 18\%$. In addition, the organic carbon source satisfies $1.5\% \leq C_3 \times \text{carbon residue rate} \leq 3.5\%$. The amount $C_3$ of the organic carbon source is a percentage of the weight of the organic carbon source added during the coating process in the total weight of the artificial graphite. The carbon residue rate is the carbon residue rate of the organic carbon source. It can be measured with LP-5731 coal pitch coking value tester. The test can be carried by referring to GB/T268 "Measurement Method for Carbon Residue in Petroleum Product" and GB/T8727-2008 "Measurement Method for Coking Value of Coal Pitch Product".

The amount of the organic carbon source added during the coating satisfies the above relationship, which can improve the granulation degree of the negative electrode active material particles, thereby helping to keep the values of A and B within the aforementioned ranges. In addition, the amount of the organic carbon source within the range and the coating layer having an appropriate proportion in the negative electrode active material enable the negative electrode active material to have relatively high kinetic performance and relatively long cycle life. Preferably, the organic carbon source satisfies $1.5\% \leq C_3 \times \text{carbon residue rate} \leq 2.5\%$. More preferably, $13\% \leq C_1 + C_2 + C_3 \leq 17\%$, and $1.8\% \leq C_3 \times \text{carbon residue rate} \leq 2.4\%$.

Optionally, $2\% \leq C_3 \leq 8\%$, for example, $C_3$ is 3%, 4%, 5%, 6%, or 7%.

In some embodiments, the organic carbon source may be selected from one or more of coal pitch, petroleum pitch, phenolic resin, coconut shell, etc., and preferably coal pitch.

Secondary Battery

An embodiment of the second aspect of the present application provides a secondary battery. The secondary battery includes a negative electrode plate, and the negative electrode plate includes the negative electrode active material according to the first aspect of the present application.

Since the secondary battery of the present application adopts the negative electrode active material according to the first aspect of the present application, it can simultaneously have relatively high energy density, cycle life and fast charging and discharging capabilities.

The secondary battery further includes a positive electrode plate and an electrolyte. During charge and discharge of the battery, active ions are repeatedly intercalated and deintercalated between the positive electrode plate and the negative electrode plate. The electrolyte conducts ions between the positive electrode plate and the negative electrode plate.

[Negative Electrode Plate]

The negative electrode plate includes a negative electrode current collector and a negative electrode film disposed on at least one surface of the negative electrode current collector, and the negative electrode film includes the negative electrode active material according to the first aspect of the present application.

In the present application, the negative electrode current collector has two opposite surfaces in its own thickness direction, and the negative electrode film is stacked on either or both of the two opposite surfaces of the negative electrode current collector.

The negative electrode current collector may be made of a material with good electrical conductivity and mechanical strength to conduct electricity and collect current. In some embodiments, the negative electrode current collector may adopt a copper foil.

In the present application, the negative electrode film may further optionally include a binder. As an example, the binder may be selected from one or more of polyacrylic acid (PAA), sodium polyacrylate (PAAS), polyacrylamide (PAM), polyvinyl alcohol (PVA), styrene butadiene rubber (SBR), sodium alginate (SA), polymethacrylic acid (PMAA), and carboxymethyl chitosan (CMCS).

In the present application, the negative electrode film may further optionally include a thickener. As an example, the thickener may be sodium carboxymethyl cellulose (CMC-Na).

In the present application, the negative electrode film may further optionally include a conductive agent. As an example, the conductive agent for the negative electrode film may be selected from one or more of superconducting carbon, acetylene black, carbon black, Ketjen black, carbon dots, carbon nanotubes, graphene, and carbon nanofibers.

In some embodiments, the negative electrode film may further include other negative electrode active materials. The other negative electrode active materials may be selected from one or more of other graphite materials (for example, different from the artificial graphite, the natural graphite, etc. according to the first aspect of the present application), soft carbon, hard carbon, silicon-based materials, and tin-based materials.

The negative electrode plate may be prepared according to a method known in the art. As an example, a negative electrode active material, a binder, an optional thickener and an optional conductive agent are dispersed in a solvent which may be deionized water to form a uniform negative electrode slurry; the negative electrode slurry is coated on a negative electrode current collector, and the negative electrode plate is obtained after steps of drying, cold pressing, etc.

[Positive Electrode Plate]

In the present application, the positive electrode plate includes a positive electrode current collector and a positive electrode film disposed on at least one surface of the positive electrode current collector. As an example, the positive electrode current collector has two opposite surfaces in its own thickness direction, and the positive electrode film is stacked on either or both of the two opposite surfaces of the positive electrode current collector.

In the present application, the positive electrode current collector may be made of a material with good electrical conductivity and mechanical strength. In some preferred embodiments, the positive electrode current collector may adopt an aluminum foil.

In the present application, the positive electrode film includes a positive electrode active material. The present application does not limit the specific type of the positive electrode active material, and may adopt materials known in the art that can be used for positive electrodes of secondary batteries, and a person skilled in the art can select the material according to actual requirements.

In some embodiments, the secondary battery may be a lithium-ion secondary battery. The positive electrode active material may include one or more of lithium transition metal oxides, lithium-containing phosphates with an olivine structure, and respective modified compounds thereof. Examples of the lithium transition metal oxides may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the lithium-containing phosphates with an olivine structure may include, but are not limited to, one or more of lithium iron phosphate, a composite material of lithium iron phosphate and carbon, lithium manganese phosphate, a composite material of lithium manganese phosphate and carbon, lithium iron manganese phosphate, a composite material of lithium iron manganese phosphate and carbon, and modified compounds thereof. The present application is not limited to these materials, and may also use other conventionally known materials that can be used as positive electrode active materials for secondary batteries.

In some preferred embodiments, in order to further increase the energy density of the battery, the positive electrode active material may include one or more of the lithium transition metal oxide shown in a formula 1 below and modified compounds thereof,

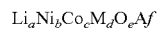   formula 1, in the formula 1, $0.8 \leq a \leq 1.2$, $0.5 \leq b < 1$, $0 < c < 1$, $0 < d < 1$, $1 \leq e \leq 2$, $0 \leq f \leq 1$, M is selected from one or more of Mn, Al, Zr, Zn, Cu, Cr, Mg, Fe, V, Ti and B, and A is selected from one or more of N, F, S and Cl.

In the present application, the modified compounds of the materials may be of doping modification and/or surface coating modification of the materials.

In the present application, the positive electrode film may further optionally include a binder. The type of the binder is not specifically limited, and a person skilled in the art can select the binder according to actual requirements. As an example, the binder for the positive electrode film may include one or more of polyvinylidene fluoride (PVDF) and polytetmfluoroethylene (PTFE).

In the present application, the positive electrode film may further optionally include a conductive agent. The type of the conductive agent is not specifically limited, and a person skilled in the art can select the conductive agent according to actual requirements. As an example, the conductive agent for the positive electrode film may include one or more of superconducting carbon, acetylene black, carbon black, Ketjen black, carbon dots, carbon nanotubes, graphene, and carbon nanofibers.

The positive electrode plate can be prepared according to a method known in the art. As an example, a positive electrode active material, a conductive agent and a binder are dispersed in a solvent (such as N-methylpyrrolidone (NMP)) to form a uniform positive electrode slurry; the positive electrode slurry is coated on a positive electrode current collector, and the positive electrode plate is obtained after steps of drying, cold pressing, etc.

[Electrolyte]

The electrolyte conducts ions between the positive electrode plate and the negative electrode plate. The type of the electrolyte is not specifically limited in the present application, and may be selected according to requirements. For example, the electrolyte may be selected from at least one of solid electrolytes and liquid electrolytes (i.e., electrolyte liquid).

In some embodiments, the electrolyte adopts electrolyte liquid. The electrolyte liquid includes an electrolyte salt and a solvent.

In some embodiments, the electrolyte salt may be selected from one or more of $LiPF_6$ (lithium hexafluorophosphate), LiBF$_4$ (lithium tetrafluoroborate), LiClO$_4$ (lithium perchlorate), LiAsF$_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), LiPO$_2$F$_2$ (lithium difluorophosphate), LiDFOP (lithium difluorobisoxalate phosphate), and LiTFOP (lithium tetrafluorooxalate phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

In some embodiments, the electrolyte liquid may further optionally include additives. For example, the additives may include negative electrode film-forming additives, positive electrode film-forming additives, and additives that can improve some performances of the battery, such as additives that improve overcharge performance of the battery, additives that improve high-temperature performance of the battery, and additives that improve low-temperature performance of the battery.

[Separator]

Secondary batteries using electrolytes and some secondary batteries using solid electrolytes further include separators. The separator is disposed between the positive electrode plate and the negative electrode plate to serve as an isolation. The type of the separator is not specially limited in the present application, and the separator may be any known porous separator with good chemical and mechanical stability. In some embodiments, the material of the separator may include one or more of glass fibers, non-woven fabric, polyethylene, polypropylene, and polyvinylidene fluoride. The separator may be a single-layer film or a multi-layer composite film. When the separator is a multi-layer composite film, materials of respective layers may be the same or different.

In some embodiments, the positive electrode plate, the negative electrode plate, and the separator can be made into an electrode assembly by a winding process or a stacking process.

In some embodiments, the secondary battery may include an outer package. The outer package may be used to package the electrode assembly and an electrolyte.

In some embodiments, the outer package of the secondary battery may be a hard case, such as a hard plastic case, an aluminum case, a steel case, etc. The outer package of the secondary battery may also be a soft bag, such as a pocket type soft bag. The material of the soft bag may be plastic, such as one or more of polypropylene (PP), polybutylene terephthalate (PBT), polybutylene succinate (PBS), etc.

Figure 2:
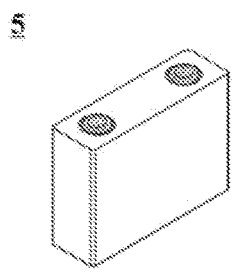
FIG. 2 is a schematic diagram of an embodiment of a secondary battery.

The present application does not have particular limitation to the shape of the secondary battery. The secondary battery may be cylindrical, cuboid, or in other arbitrary shape. FIG. 2 shows a secondary battery 5 with a cuboid structure as an example.

Figure 3:
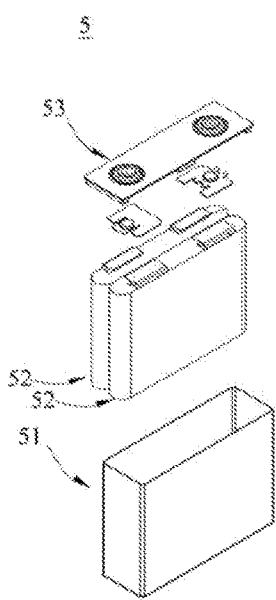
FIG. 3 is an exploded view of FIG. 2.

In some embodiments, referring to FIG. 3, the outer package may include a shell 51 and a cover plate 53. The shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity.

The electrode assembly 52 is packaged in the receiving cavity. The electrolyte may adopt electrolyte liquid, and the electrolyte liquid infiltrates the electrode assembly 52. The secondary battery 5 includes one or more electrode assemblies 52, which can be adjusted according to requirements.

In some embodiments, the secondary batteries may be assembled into a battery module, the battery module may include a plurality of secondary batteries, and the specific number can be adjusted according to the application and capacity of the battery module.

Figure 4:
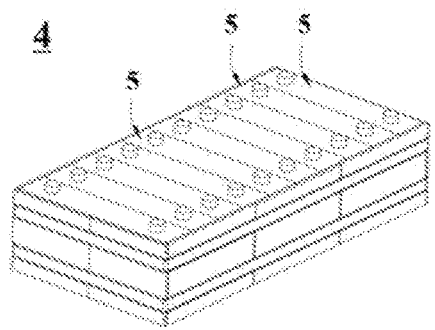
FIG. 4 is a schematic diagram of an embodiment of a battery module.

FIG. 4 shows a battery module 4 as an example. Referring to FIG. 4, in the battery module 4, a plurality of secondary batteries 5 may be arranged sequentially in a length direction of the battery module 4. Of course, they may also be arranged in any other way. Further, the plurality of secondary batteries 5 may be fixed by fasteners.

Optionally, the battery module 4 may further include a housing having a receiving space, and the plurality of secondary batteries 5 are received in the receiving space.

In some embodiments, the above-mentioned battery module may also be assembled into a battery pack, and the number of battery modules included in the battery pack may be adjusted according to the application and capacity of the battery pack.

Figure 5:
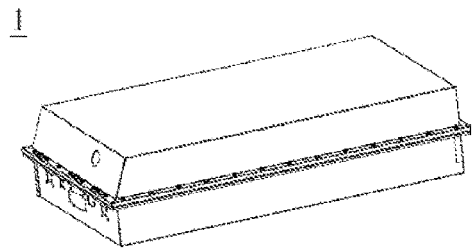
FIG. 5 is a schematic diagram of an embodiment of a battery pack.
Figure 6:
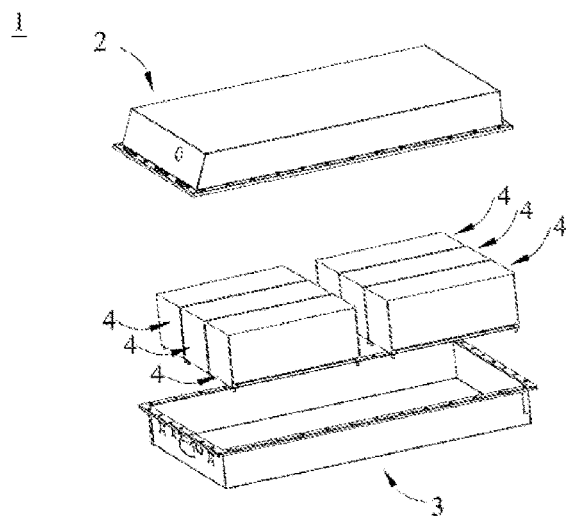
FIG. 6 is an exploded view of FIG. 5.

FIGS. 5 and 6 show a battery pack 1 as an example. Referring to FIGS. 5 and 6, the battery pack 1 may include a battery box and a plurality of battery modules 4 disposed in the battery box. The battery box includes an upper box body 2 and a lower box body 3. The upper box body 2 may cover the lower box body 3 to form a closed space for receiving the battery modules 4. The plurality of battery modules 4 may be arranged in the battery box in any manner.

Apparatus

The second aspect of the present application provides an apparatus, including the secondary battery according to the first aspect of the present application. The secondary battery may be used as a power supply of the apparatus, and may also be used as an energy storage unit of the apparatus. The apparatus may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may select the secondary battery, the battery module, or the battery pack according to its usage requirements.

Figure 7:
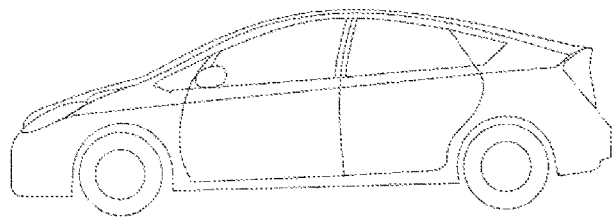
FIG. 7 is a schematic diagram of an embodiment of an apparatus using the secondary battery as a power supply.

FIG. 7 shows an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module may be used.

As another example, the apparatus may be a mobile phone, a tablet computer, a notebook computer, etc. The apparatus is generally required to be thin and light, and the secondary battery can be used as a power supply.

Some exemplary embodiments of the present application are provided as follows.

Embodiment 1. A negative electrode active material, comprising a core and a coating layer covering a surface of the core, wherein the core comprises artificial graphite, the coating layer comprises amorphous carbon, the negative electrode active material has a surface area average particle size D(3,2) denoted as A, the negative electrode active material has a surface area average particle size D(3,2) denoted as B after powder compaction under a pressure of 20 kN, and the negative electrode active material satisfies: 72%≤B/A×100%≤82%.

Embodiment 2. The negative electrode active material according to embodiment 1, wherein the negative electrode active material satisfies: 74%≤B/A×100%≤80%.

Embodiment 3. The negative electrode active material according to embodiment 1 or 2, wherein 9 μm≤A≤15 μm, and preferably, 11 μm≤A≤13 μm.

Embodiment 4. The negative electrode active material according to any one of embodiments 1 to 3, wherein the negative electrode active material has a volume average particle size $D_v50$ satisfying: 10 μm≤$D_v50$≤16 μm, and preferably, 12 μm≤$D_v50$≤14 μm.

Embodiment 5. The negative electrode active material according to any one of embodiments 1 to 4, wherein the negative electrode active material has a particle size distribution ($D_v90$–$D_v10$)/$D_v50$ satisfying: 1.0≤($D_v90$–$D_v10$)/$D_v50$≤1.35, and preferably, 1.15≤($D_v90$–$D_v10$)/$D_v50$≤1.25.

Embodiment 6. The negative electrode active material according to any one of embodiments 1 to 5, wherein the negative electrode active material has a volume particle size distribution $D_v90$ satisfying: 18 μm≤$D_v90$≤26 μm, and preferably, 20 μm≤$D_v90$≤24 μm.

Embodiment 7. The negative electrode active material according to any one of embodiments 1 to 6, wherein the negative electrode active material has a tap density of from 0.9 g/cm³ to 1.15 g/cm³, and preferably from 0.95 g/cm³ to 1.05 g/cm³.

Embodiment 8. The negative electrode active material according to any one of embodiments 1 to 7, wherein the negative electrode active material has a graphitization degree of from 90% to 96%, and preferably from 92% to 95%.

Embodiment 9. The negative electrode active material according to any one of embodiments 1 to 8, wherein the negative electrode active material has a powder OI value of from 2.0 to 5.0, and preferably from 2.1 to 4.0.

Embodiment 10. The negative electrode active material according to any one of embodiments 1 to 8, wherein the negative electrode active material has a gram capacity C satisfying: 350 mAh/g≤C≤356 mAh/g, and preferably, 352 mAh/g≤C≤354 mAh/g.

Embodiment 11. A secondary battery, comprising a negative electrode plate comprising the negative electrode active material according to any one of embodiments 1 to 10.

Embodiment 12. An apparatus, comprising the secondary battery according to embodiment 11.

Embodiment 13. A method for preparation of a negative electrode active material, comprising the following steps:

a) providing a coke raw material, wherein the coke raw material has a volume average particle size $D_v50$ of from 7 μm to 12 μm, and the coke raw material has a volatile content $C_1$ satisfying 1%≤$C_1$≤12%, and preferably, 5%≤$C_1$≤9%;

b) shaping and grading the coke raw material to obtain a precursor with a particle size distribution ($D_v90$–$D_v10$)/$D_v50$ of from 1.0 to 1.55;

c) granulating the precursor to obtain a granulated product, wherein a binder added during the granulating has an amount $C_2$ satisfying 0%≤$C_2$≤16%, and the $C_1$ and the $C_2$ satisfy 10%≤$C_1$+$C_2$≤16%, and preferably, 12%≤$C_1$+$C_2$≤14%;

d) graphitizing the granulated product at a temperature of from 2800° C. to 3200° C. to obtain artificial graphite;

e) coating the artificial graphite with an organic carbon source, performing heat treatment to form an amorphous carbon coating layer on at least a part of the surface of the artificial graphite, to obtain the negative electrode active material, wherein the organic carbon source added during the coating has an amount $C_3$, and the $C_3$, the $C_1$ and the $C_2$ satisfy 13%≤$C_1$+$C_2$+$C_3$≤18%, and 1.5%≤$C_3$×carbon residue rate≤3.5%;

wherein the negative electrode active material has a surface area average particle size D(3,2) denoted as A, the negative electrode active material has a surface area average particle size D(3,2) denoted as B after powder compaction under a pressure of 20 kN, and the negative electrode active material satisfies: 72%≤B/A×100%≤82%.

Embodiment 14. The method according to embodiment 13, wherein the coke raw material further satisfies at least one of the following:

1) the coke raw material comprises one or more of petroleum-based non-needle coke and petroleum-based needle coke; preferably, the coke raw material comprises petroleum-based green coke; and 2) the coke raw material has a particle size distribution ($D_v90$–$D_v10$)/$D_v50$ of from 1.2 to 1.7.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Preparation of a Negative Electrode Active Material

1) Crushing of raw material: crushing petroleum calcined coke with a mechanical mill or a roller mill. The coke as a raw material contained 1 wt % of volatiles and 0.5 wt % of sulfur. After the crushing, grading was carried out to control the particle size distribution of the obtained coke raw material. $D_v50$ of the coke raw material=8 μm, ($D_v90$–$D_v10$)/$D_v50$=1.61.

2) Shaping and grading: shaping the coke raw material obtained in step 1) with a shaping machine, and then performing a grading treatment to obtain a precursor with a particle size distribution ($D_v90$–$D_v10$)/$D_v50$ of 1.51.

3) Granulating: mixing the precursor obtained in step 2) with a binder, and granulating the precursor with a granulator. The binder was added during the granulating in an amount of $C_2$=10 wt %, and $C_1$+$C_2$=11 wt %.

4) Graphitizing: adding the granulated product obtained in step 3) into a graphitization furnace, and performing a graphitizing treatment at 3000° C. to obtain artificial graphite.

5) Coating: mixing the artificial graphite obtained in step 4) with pitch as an organic carbon source coal, and performing a heat treatment at 1050° C. to obtain a negative electrode active material.

The organic carbon source was added during the coating process in an amount of $C_3$, and the $C_3$, $C_1$ and $C_2$ satisfy $C_1+C_2+C_3=14$ wt %, and $C_3 \times$ carbon residue rate$\leq 2$%.

Preparation of a Negative Electrode Plate

The negative electrode active material prepared above, carbon black (Super P) as a conductive agent, styrene-butadiene rubber (SBR) as a binder, and sodium carboxymethyl cellulose (CMC-Na) as a thickener were mixed thoroughly at a weight ratio of 96.4:1:1.2:1.4 in an appropriate amount of deionized water to form a uniform negative electrode slurry; the negative electrode slurry was coated on the surface of a copper foil as a negative electrode current collector, and a negative electrode plate was obtained after drying and cold pressing. The negative electrode plate had a compaction density of 1.65 g/cm$^3$ and an areal density of 11 mg/cm$^2$.

Preparation of a Positive Electrode Plate $LiNi_{0.5}Co_{0.2}Mn_{0.3}O_2$(NCM523) as a positive electrode active material, carbon black (Super P) as a conductive agent, and polyvinylidene fluoride (PVDF) as a binder were mixed thoroughly at a weight ratio of 96:2:2 in an appropriate amount of N-methylpyrrolidone (NMP) to form a uniform positive electrode slurry; the positive electrode slurry was coated on the surface of an aluminum foil as a positive electrode current collector, and a positive electrode plate was obtained after drying and cold pressing. The positive electrode plate had a compaction density of 3.45 g/cm$^3$ and an areal density of 19 mg/cm$^2$.

Preparation of an Electrolyte

Ethylene carbonate (EC), ethyl methyl carbonate (EMC), and diethyl carbonate (DEC) were mixed at a volume ratio of 1:1:1, and then $LiPF_6$ was uniformly dissolved in the solution to obtain an electrolyte, wherein $LiPF_6$ had a concentration of 1 mol/L.

Separator

A polyethylene film was used.

Preparation of a Secondary Battery

The positive electrode plate, the separator, and the negative electrode plate were stacked in order and wound to obtain an electrode assembly, the electrode assembly was packaged in an outer package, the above-mentioned electrolyte was added, and a secondary battery was obtained after steps including packaging, standing, formation, and aging.

Examples 2 to 18 (Ex. 2 to Ex. 18) and
Comparative Examples 1 and 2 (CE 1 and CE 2)

Example 1 (Ex. 1) was repeated with the exceptions that relevant parameters in the preparation process of the negative electrode plate were adjusted to obtain corresponding secondary batteries, as shown in Table 1 to Table 6 for details.

Test Section

1) Cycle Performance Test of Batteries

At 25° C., the lithium-ion secondary batteries prepared in the examples and comparative examples were charged and discharged at a rate of 1 C for full charge and full discharge cycle tests until the discharge capacity of the batteries was less than 80% of the initial discharge capacity, and the number of cycles of the lithium-ion secondary battery was recorded.

2) Fast Charging Performance Test of Batteries

At 25° C., the batteries prepared in the examples and comparative examples were charged to 80% SOC (State of Charge) in 30 min, fully charged to 100% SOC at 0.33 C, and fully discharged at 1 C. Such a cycle was repeated 10 times. Then the batteries were charged to 80% SOC in 30 min, and fully charged to 100% SOC at 0.33 C. Then the negative electrode plate was removed from the battery, and lithium precipitation on the surface of the negative electrode plate was observed. If no lithium was precipitated on the surface of the negative electrode, the time for charging to 80% SOC was gradually decreased by 1 min and the test was carried out again and not stopped until lithium was precipitated on the surface of the negative electrode, and 1 min+ the time (min) for charging to 80% SOC was the maximum charging capacity of the battery.

TABLE 1

Preparation parameters

| No. | Type of coke raw materials | $C_1$ wt % | $C_2$ wt % | $C_3$ wt % | $C_1 + C_2$ wt % | $C_1 + C_2 + C_3$ wt % | $C_3 \times$ carbon residue rate % |
|---|---|---|---|---|---|---|---|
| Ex. 1 | Petroleum calcined coke | 1.0 | 10.0 | 3.0 | 11.0 | 14.0 | 2.0 |
| Ex. 2 | Petroleum-based needle coke | 7.0 | 3.0 | 3.0 | 10.0 | 13.0 | 2.0 |
| Ex. 3 | Petroleum-based needle coke | 7.0 | 5.0 | 3.0 | 12.0 | 15.0 | 2.4 |
| Ex. 4 | 70% petroleum-based needle coke + 30% petroleum-based green coke | 7.0 | 5.0 | 4.0 | 12.0 | 16.0 | 2.0 |
| Ex. 5 | Petroleum-based needle coke | 7.0 | 8.0 | 3.0 | 15.0 | 18.0 | 2.0 |
| Ex. 6 | 70% petroleum-based needle coke + 30% petroleum-based green coke | 10.0 | 2.0 | 3.0 | 12.0 | 15.0 | 2.0 |
| Ex. 7 | Petroleum-based green coke | 10.0 | 4.0 | 4.0 | 14.0 | 18.0 | 2.4 |
| Ex. 8 | Petroleum-based green coke | 12.0 | 0.0 | 6.0 | 12.0 | 18.0 | 3.5 |
| CE 1 | Petroleum calcined coke | 1.0 | 6.0 | 3.0 | 7.0 | 10.0 | 2.0 |
| CE 2 | Petroleum-based needle coke | 7.0 | 10.0 | 3.0 | 17.0 | 20.0 | 2.0 |

TABLE 2

Test results

| No. | A μm | B/A × 100% | $D_v50$ μm | $(D_v90-D_v10)/D_v50$ | Tap density g/cm$^3$ | Fast charging performance min | 1C/1C cycles |
|---|---|---|---|---|---|---|---|
| Ex. 1 | 13.1 | 77.9% | 11.60 | 1.28 | 0.99 | 30 | 2500 |
| Ex. 2 | 12.9 | 77.3% | 11.80 | 1.22 | 1.03 | 25 | 2000 |
| Ex. 3 | 13.1 | 76.4% | 12.10 | 1.25 | 1.02 | 26 | 2200 |
| Ex. 4 | 12.7 | 75.8% | 12.50 | 1.16 | 1.01 | 20 | 1900 |
| Ex. 5 | 13.3 | 75.1% | 12.00 | 1.18 | 0.95 | 25 | 1800 |

TABLE 2-continued

| No. | A μm | B/A × 100% | $D_v50$ μm | $(D_v90-D_v10)/D_v50$ | Tap density g/cm³ | Fast charging performance min | 1C/1C cycles |
|---|---|---|---|---|---|---|---|
| Ex. 6 | 12.9 | 74.5% | 13.60 | 1.2 | 0.98 | 22 | 1600 |
| Ex. 7 | 14.2 | 73.8% | 12.80 | 1.15 | 0.96 | 18 | 1600 |
| Ex. 8 | 14.5 | 72.2% | 13.70 | 1.06 | 0.99 | 19 | 2100 |
| CE 1 | 12.2 | 83.8% | 11.40 | 1.33 | 1.02 | 70 | 200 |
| CE 2 | 14.2 | 70.5% | 15.20 | 1.01 | 0.95 | 18 | 600 |

From the comparison results of Examples 1-8 and Comparative Examples 1-2, it can be seen that the negative electrode active material provided by the present application included a core and an amorphous carbon coating layer covering at least a part of the surface of the core, the core included artificial graphite, and the negative electrode active material satisfied a specific relationship between D(3,2) before and after powder compaction under a pressure of 20 kN, and the negative electrode active material provided by the present application enabled the coke raw material to have a relatively high gram capacity while greatly improving the fast active ion transport capability of the negative electrode active material and its structural stability under force, so that the fast charging capability and cycle life of the secondary battery were improved based on the premise of relatively high energy density. Therefore, the secondary battery can simultaneously have relatively high energy density, fast charging performance and cycle performance.

The negative electrode active material in Comparative Example 1 had a relatively high B/A value and poor kinetic performance, which cannot achieve fast charging. The negative electrode active material in Comparative Example 2 had a relatively low B/A value and poor stability during battery cycle, which reduced the cycle performance of the battery.

TABLE 3

| | Preparation parameters | | | | | | |
|---|---|---|---|---|---|---|---|
| | Coke raw material | | $(D_v90-D_v10)/D_v50$ after shaping and grading | | | $C_1 + C_2 +$ | $C_1 + C_3 \times$ carbon |
| No. | $D_v50$ μm | $C_1$ wt % | | $C_2$ wt % | $C_3$ wt % | $C_2$ wt % | $C_3$ wt % residue rate % |
| Ex. 9 | 7 | 7 | 1.21 | 3.0 | 3.0 | 10.0 | 13.0 | 2.0 |
| Ex. 10 | 10 | 7 | 1.03 | 3.0 | 3.0 | 10.0 | 13.0 | 2.0 |
| Ex. 11 | 10 | 7 | 1.25 | 3.0 | 3.0 | 10.0 | 13.0 | 2.0 |
| Ex. 12 | 10 | 7 | 1.48 | 3.0 | 3.0 | 10.0 | 13.0 | 2.0 |
| Ex. 13 | 12 | 7 | 1.24 | 3.0 | 3.0 | 10.0 | 13.0 | 2.0 |

The coke raw materials in Table 3 were all petroleum-based needle coke.

TABLE 4

| No. | A μm | B/A × 100% | $D_v50$ μm | $(D_v90-D_v10)/D_v50$ | Tap density g/cm³ | Fast charging performance min | 1C/1C cycles |
|---|---|---|---|---|---|---|---|
| Ex. 9 | 12.9 | 77.3% | 11.80 | 1.22 | 1.03 | 25 | 2000 |
| Ex. 10 | 12.9 | 77.5% | 13.20 | 1.2 | 1.04 | 24 | 1800 |
| Ex. 11 | 12.6 | 79.5% | 12.60 | 1.26 | 1.11 | 27 | 2100 |
| Ex. 12 | 12.5 | 79.8% | 12.40 | 1.29 | 1.12 | 26 | 2200 |
| Ex. 13 | 12.5 | 80.3% | 15.40 | 1.29 | 1.14 | 25 | 1700 |

From the results of Examples 9-13, it can be seen that the particle size distribution of the negative electrode active material within an appropriate range was more beneficial for enabling the battery to simultaneously have relatively high energy density, fast charging performance and cycle performance.

TABLE 5

| | Preparation parameters | | | | | | |
|---|---|---|---|---|---|---|---|
| | Coke raw material | | $(D_v90-D_v10)/D_v50$ after shaping and grading | | | $C_1 + C_2 +$ | $C_1 + C_3 \times$ carbon |
| No. | $D_v50$ μm | $C_1$ wt % | | $C_2$ wt % | $C_3$ wt % | $C_2$ wt % | $C_3$ wt % residue rate % |
| Ex. 14 | 7 | 7 | 1.27 | 5.0 | 3.0 | 12.0 | 15.0 | 2.0 |
| Ex. 15 | 9 | 7 | 1.24 | 3.0 | 3.0 | 10.0 | 13.0 | 2.0 |
| Ex. 16 | 9 | 7 | 1.25 | 5.0 | 3.0 | 12.0 | 15.0 | 2.0 |
| Ex. 17 | 9 | 7 | 1.23 | 7.0 | 3.0 | 14.0 | 17.0 | 2.0 |
| Ex. 18 | 11 | 7 | 1.26 | 5.0 | 3.0 | 12.0 | 15.0 | 2.0 |

TABLE 6

| No. | A μm | B/A × 100% | $D_v50$ μm | $(D_v90 - D_v10)/D_v50$ | Tap density g/cm³ | Fast charging performance min | 1C/1C cycles |
|---|---|---|---|---|---|---|---|
| Ex. 14 | 13.2 | 75.6% | 10.10 | 1.23 | 1.08 | 24 | 1900 |
| Ex. 15 | 12.7 | 78.8% | 11.80 | 1.32 | 1.11 | 29 | 2050 |
| Ex. 16 | 13.3 | 75.0% | 12.40 | 1.22 | 1.07 | 25 | 2100 |
| Ex. 17 | 13.9 | 72.0% | 13.20 | 1.18 | 1.02 | 19 | 1900 |
| Ex. 18 | 12.6 | 79.5% | 14.80 | 1.29 | 1.12 | 25 | 2300 |

From the results of Examples 14-18, it can be seen that the particle size values of the negative electrode active material within an appropriate ranges were more beneficial for enabling the battery to simultaneously have relatively high energy density, fast charging performance and cycle performance.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A negative electrode active material, comprising a core and a coating layer covering a surface of the core, wherein the core comprises artificial graphite, the coating layer comprises amorphous carbon, the negative electrode active material has a surface area average particle size D(3,2) denoted as A, the negative electrode active material has a surface area average particle size D(3,2) denoted as B after powder compaction under a pressure of 20 kN, and the negative electrode active material satisfies: 72%≤B/A× 100%≤82%.

2. The negative electrode active material according to claim 1, wherein the negative electrode active material satisfies: 74%≤B/A×100%≤80%.

3. The negative electrode active material according to claim 1, wherein 9 μm≤A≤15 μm, and preferably, 11 μm≤A≤13 μm.

4. The negative electrode active material according to claim 1, wherein the negative electrode active material before powder compaction has a volume average particle size $D_v50$ satisfying: 10 μm≤$D_v50$≤16 μm, and preferably, 12 μm≤$D_v50$≤14 μm.

5. The negative electrode active material according to claim 1, wherein the negative electrode active material before powder compaction has a particle size distribution $(D_v90-D_v10)/D_v50$ satisfying: 1.0≤$(D_v90-D_v10)/D_v50$≤1.35, and preferably, 1.15≤$(D_v90-D_v10)/D_v50$≤1.25.

6. The negative electrode active material according to claim 1, wherein the negative electrode active material before powder compaction has a volume particle size distribution $D_v90$ satisfying: 18 μm≤$D_v90$≤26 μm, and preferably, 20 μm≤$D_v90$≤24 μm.

7. The negative electrode active material according to claim 1, wherein the negative electrode active material before powder compaction has a tap density of from 0.9 g/cm³ to 1.15 g/cm³, and preferably from 0.95 g/cm³ to 1.05 g/cm³.

8. The negative electrode active material according to claim 1, wherein the negative electrode active material has a graphitization degree of from 90% to 96%, and preferably from 92% to 95%.

9. A secondary battery, comprising a negative electrode plate comprising the negative electrode active material according to claim 1.

10. An apparatus, comprising the secondary battery according to claim 9.

11. A method for preparation of the negative electrode active material according to claim 1, comprising the following steps of:
 a) providing a coke raw material, wherein the coke raw material has a volume average particle size $D_v50$ of from 7 μm to 12 μm, and the coke raw material has a volatile content $C_1$ satisfying 1%≤$C_1$≤12%, and preferably, 5%≤$C_1$≤9%;
 b) shaping and grading the coke raw material to obtain a precursor with a particle size distribution $(D_v90-D_v10)/D_v50$ of from 1.0 to 1.55;
 c) granulating the precursor to obtain a granulated product, wherein a binder added during the granulating has an amount $C_2$ satisfying 0%≤$C_2$≤16%, and the $C_1$ and the $C_2$ satisfy 10%≤$C_1+C_2$≤16%, and preferably, 12%≤$C_1+C_2$≤14%;
 d) graphitizing the granulated product at a temperature of from 2800° C. to 3200° C. to obtain artificial graphite;
 e) coating the artificial graphite with an organic carbon source, performing heat treatment to form an amorphous carbon coating layer on at least a part of the surface of the artificial graphite, to obtain the negative electrode active material, wherein the organic carbon source added during the coating has an amount $C_3$, and the $C_3$, the $C_1$ and the $C_2$ satisfy 13%≤$C_1+C_2+C_3$≤18%, and 1.5%≤$C_3$×carbon residue rate≤3.5%;
 wherein the negative electrode active material has a surface area average particle size D(3,2) denoted as A, the negative electrode active material has a surface area average particle size D(3,2) denoted as B after powder compaction under a pressure of 20 kN, and the negative electrode active material satisfies: 72%≤B/A× 100%≤82%.

12. The method according to claim 11, wherein the coke raw material further satisfies at least one of the following:
 1) the coke raw material comprises one or more of petroleum-based non-needle coke and petroleum-based needle coke; preferably, the coke raw material comprises petroleum-based green coke; and
 2) the coke raw material has a particle size distribution $(D_v90-D_v10)/D_v50$ of from 1.2 to 1.7.

* * * * *